United States Patent
Hohmann et al.

(10) Patent No.: US 9,317,797 B2
(45) Date of Patent: Apr. 19, 2016

(54) CHIP CARD WITH A DISPLAY

(75) Inventors: Arno Hohmann, Munich (DE); Hans Graf, Rosenheim (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 793 days.

(21) Appl. No.: 10/490,453

(22) PCT Filed: Sep. 24, 2002

(86) PCT No.: PCT/EP02/10696
§ 371 (c)(1),
(2), (4) Date: Aug. 20, 2004

(87) PCT Pub. No.: WO03/030096
PCT Pub. Date: Apr. 10, 2003

(65) Prior Publication Data
US 2004/0263431 A1    Dec. 30, 2004

(30) Foreign Application Priority Data

Sep. 25, 2001   (DE) .................................. 10147140

(51) Int. Cl.
G09G 5/00 (2006.01)
G06K 19/077 (2006.01)

(52) U.S. Cl.
CPC ........ G06K 19/07703 (2013.01); G06K 19/077 (2013.01)

(58) Field of Classification Search
CPC .................. G06K 19/07703; G06K 19/077
USPC ........ 40/5, 446, 448, 450–452; 235/383, 385, 235/375; 340/825.35; 345/1.1, 204; 705/20, 705/23
See application file for complete search history.

(56) References Cited

U.S. PATENT DOCUMENTS

| | | | |
|---|---|---|---|
| 4,746,787 A * | 5/1988 | Suto et al. ..................... | 235/379 |
| 5,081,520 A | 1/1992 | Kowa et al. | |
| 5,285,057 A * | 2/1994 | Murohara ........ | G06K 19/07703 174/250 |
| 5,742,075 A | 4/1998 | Gruber et al. | |
| 5,975,420 A * | 11/1999 | Gogami ........... | G06K 19/07728 235/488 |

(Continued)

FOREIGN PATENT DOCUMENTS

| | | |
|---|---|---|
| DE | 19630611 C1 | 11/1997 |
| DE | 19631557 A1 | 2/1998 |

(Continued)

OTHER PUBLICATIONS

H. Lemme; "Ultraflache Displays für Chipkarten Kunststoffsubstrate Und Ferroelektrische Flüssigkristalle;" Elektronik, Franzis Verlag GmbH, Munchen, DE; vol. 48; No. 20; Oct. 5, 1999, pp. 68,73-75.

*Primary Examiner* — Rodney Amadiz
(74) *Attorney, Agent, or Firm* — Rothwell, Figg, Ernst & Manbeck, P.C.

(57) ABSTRACT

Chip card processor P and display controller C of chip card 1 with a display are realized in single chip 5 and the chip 5 is disposed on same substrate 4 on which display 2 is built up. This eliminates the need for connecting leads and contactings between the display controller and the processor chip. Display 2 and chip 5 form one mechanical unit and it is unnecessary to install processor chip P. Preferably, display substrate 4 extends with processor chip P, or at least with conductive paths leading to processor chip P, under contact pad 3 of chip card 1.

7 Claims, 1 Drawing Sheet

(56) References Cited

U.S. PATENT DOCUMENTS

| | | | |
|---|---|---|---|
| 6,019,284 A * | 2/2000 | Freeman et al. | 235/380 |
| 6,089,453 A * | 7/2000 | Kayser et al. | 235/383 |
| 6,293,470 B1 * | 9/2001 | Asplund | 235/487 |
| 6,466,488 B2 * | 10/2002 | Sowards et al. | 365/189.07 |
| 6,568,600 B1 * | 5/2003 | Carpier et al. | 235/492 |
| 8,138,566 B1 | 3/2012 | Leydier et al. | |
| 2001/0040186 A1 * | 11/2001 | Okada | G06K 19/07728 235/492 |
| 2001/0054005 A1 * | 12/2001 | Hook et al. | 705/20 |

FOREIGN PATENT DOCUMENTS

| | | |
|---|---|---|
| DE | 29803987 U1 | 5/1998 |
| DE | 199 29 912 A1 | 1/2001 |
| DE | 199 33 757 A1 | 1/2001 |
| DE | 199 63 165 C1 | 3/2001 |
| JP | S61177586 A | 8/1986 |
| JP | H04173194 A | 6/1992 |
| JP | H11-120312 A | 4/1999 |
| WO | 0024058 A1 | 4/2000 |
| WO | WO 0043951 A1 * | 7/2000 |

* cited by examiner

CHIP CARD WITH A DISPLAY

CROSS-REFERENCE TO RELATED APPLICATION

This application is a §371 of PCT Application Serial No. PCT/EP02/10696, filed Sep. 24, 2002.

BACKGROUND OF THE INVENTION

1. Field of the Invention

This invention relates to a chip card with a display, in particular an electronic purse in chip card format, comprising a chip card processor for processing data and a display controller for driving the display to display certain data on the display.

2. Description of the Background Art

Such a chip card is known for example from DE 196 31 557 A1. The display serves the purpose of permitting the data content of the chip card, for example the cash balance of the electronic purse, to be determined without any technical aids by being indicated on the display. The display controller is formed as a chip separate from the chip card processor for security reasons, but can also be implemented physically on the chip of the chip card processor as a logically and functionally separate unit.

However, since a great number of connecting leads must be conducted from the display to the display controller, altogether 35 leads for a five-place 7-segment display, it is inexpedient to implement the display controller on the chip of the chip card processor. Instead, a separate display controller chip is usually integrated into the display and applied to the same glass or plastic substrate on which the display is built up. This is expedient in particular when the display has transparent indium-tin oxide conductive paths (ITO) so that the connecting leads to the display controller can likewise be realized as ITO conductive paths on the same substrate without any special effort.

SUMMARY OF THE INVENTION

The present invention is based on the problem of further reducing the contacting effort in chip cards with displays.

This problem is solved according to the invention by a chip card with a display having the features of independent claim 1. Advantageous embodiments of the invention are stated in the dependent claims.

Accordingly, the chip card processor is shifted into the display by the functions of the display controller and the chip card processor being realized in a single chip, i.e. on a common semiconductor substrate, and said chip being applied to the same substrate to which the display, or the contacting plane of the display, is applied.

This eliminates the connecting leads and elaborate contactings between the display controller chip and the processor chip, which in chip cards was hitherto always located under the contact pad of the chip card. The invention makes it possible that only five connecting leads to the contact pad of the card are necessary. Due to the generously dimensioned, precisely positioned contact pad areas, this contacting can be produced without much effort.

Further advantages of the invention are that only one chip must be produced instead of two separate chips. In particular, the chip and the display form one mechanical unit that is integrated into the card as a single compact component. It is thus unnecessary to install a separate processor chip.

According to an advantageous embodiment of the invention, the display substrate extends under the contact pad of the chip card to keep the contacting effort as low as possible. For this purpose, the display substrate is located with the chip card processor, or at least with contact terminals leading to the chip card processor, under the contact pad of the chip card.

BRIEF DESCRIPTION OF THE DRAWINGS

In the following the invention will be explained by way of example with reference to the accompanying drawings, in which.

DETAILED DESCRIPTION OF THE INVENTION

Figure 1:
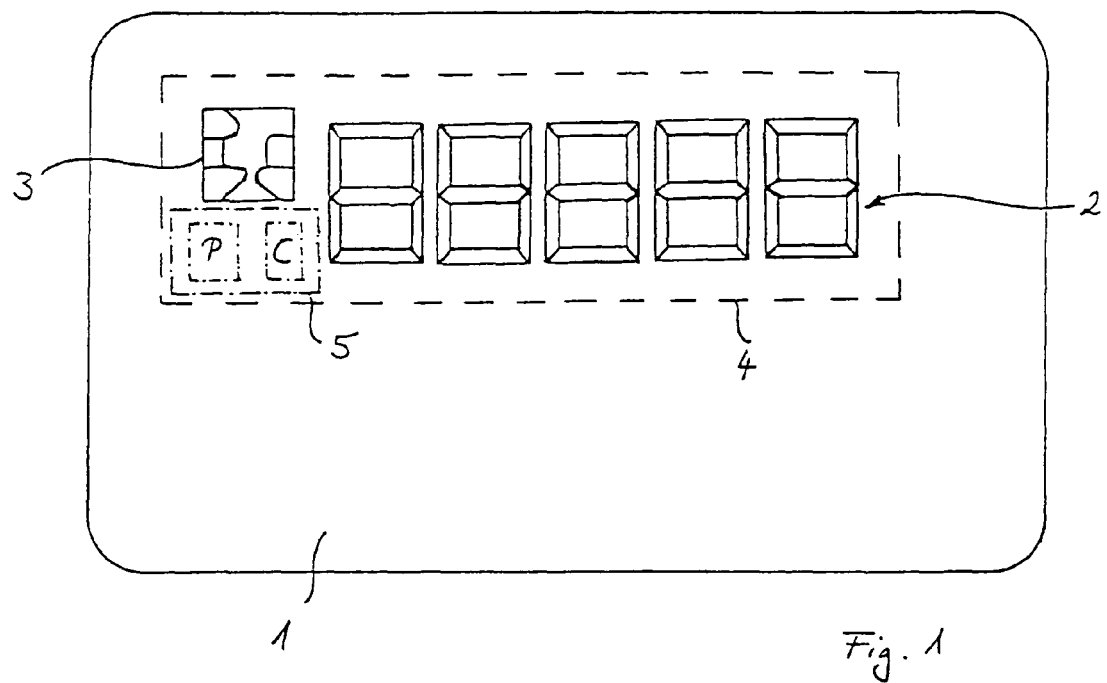
FIG. 1 shows a card with a display in a plan view with a display substrate integrated into the card.

FIG. 1 shows chip card 1 with display 2 and contact pad 3 for contact-type data transfer between chip card 1 and a data processing device. The chip card is for example a card with a purse function. Further elements can be integrated into the card, in particular a keyboard or at least a switch for activating the display, and a signature stripe, magnetic stripe, embossings and the like.

Display 2 is executed in the shown embodiment as a five-place 7-segment display. However, the invention is fundamentally suitable in connection with any kind of display.

FIG. 1 shows by dash lines the components relevant to the invention that are located inside the card. These are, firstly, display substrate 4 on which the structures and layers of display 2 are built up and, secondly, applied to display substrate 4, semiconductor substrate 5 with chip card processor P and display controller C.

FIG. 1 in addition indicates that display substrate 4 extends under contact pad 3 of chip card 1.

Figure 2:
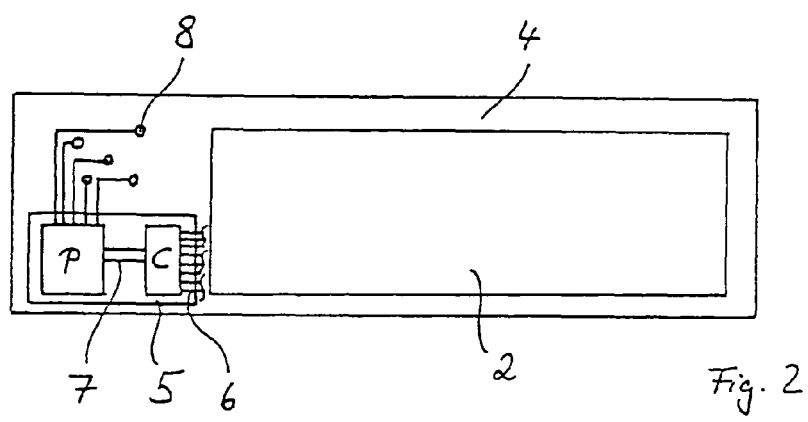
FIG. 2 shows the display substrate of the card according to FIG. 1 with components disposed thereon.

FIG. 2 shows display substrate 4 from FIG. 1 separately in a plan view. Display controller C, chip card processor P and intermediate conductive paths 7 are realized jointly on semiconductor substrate 5, and semiconductor substrate 5 is in turn applied to display substrate 4. Display 2 is not shown in detail since its structure is of minor importance to the invention. Display controller C drives via conductive paths 6 the individual segments of display 2 shown in FIG. 1. Altogether there are 35 segments and accordingly 35 conductive paths 6-one conductive path for each display segment-but for simplicity's sake they are not all shown in FIG. 2.

Chip card processor P is itself connected via conductive paths with contact terminals 8 located under contact pad 3 of chip card 1. Electric contacting of contact terminals 8 with the contact areas of contact pad 3 is thus possible in simple fashion. Alternatively, chip card processor P can be disposed with its contact terminals immediately under contact pad 3, which is not explicitly shown here. This arrangement has the advantage that the contact pad with its frame offers the semiconductor effective protection against breakage.

The invention claimed is:

1. A chip card comprising: a contact pad for data transfer; a display; a chip card processor for data processing; and a display controller that is separate from the chip card processor, for driving the display to permit certain data, generated on the chip card, to be displayed on the display; wherein: the chip card processor and the display controller are realized on a common semiconductor substrate and said semiconductor substrate is directly applied onto a same substrate on which the display is directly built up, thereby forming a mechanical unit that is integrated into the chip card as a single compact component, and the same substrate on which the display is directly built up extends under the contact pad of the chip card such that the chip card processor is located immediately under the contact pad; wherein immediately placing the chip card processor below the contact pad reduces the chip card's breakage capabilities.

2. A chip card according to claim 1, wherein the same substrate on which the display is directly built up extends under the contact pad of the chip card such that contact terminals leading from the chip card processor to the contact pad are located under the contact pad.

3. A chip card according to claim 1, wherein the data are generated by the chip card processor.

4. A chip card according to claim 1, wherein the data are generated by the display controller.

5. A chip card according to claim 1, wherein the data are financial data associated with an electronic purse.

6. A chip card according to claim 1, wherein the contact pad, the chip card processor and the display are arranged on the same side of substrate on which the display is directly built up.

7. The chip card according to claim 1, wherein five connecting leads connect to the contact pad.

* * * * *